(12) United States Patent
Tiberghien et al.

(10) Patent No.: US 7,753,415 B2
(45) Date of Patent: Jul. 13, 2010

(54) QUICK CONNECTION AND METHOD FOR UNCOUPLING THE MALE AND FEMALE ELEMENTS OF SUCH A CONNECTION

(75) Inventors: Alain-Christophe Tiberghien, Sevrier (FR); Antoine Chambaud, Giez (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 12/314,049

(22) Filed: Dec. 3, 2008

(65) Prior Publication Data

US 2009/0085348 A1 Apr. 2, 2009

Related U.S. Application Data

(62) Division of application No. 11/037,474, filed on Jan. 19, 2005, now Pat. No. 7,472,930.

(30) Foreign Application Priority Data

Jan. 20, 2004 (FR) .................................. 04 00493

(51) Int. Cl.
*F16L 37/00* (2006.01)
(52) U.S. Cl. .................. 285/316; 285/308; 285/317; 285/924
(58) Field of Classification Search .................. 285/308, 285/316–317, 921, 924
See application file for complete search history.

(56) References Cited

U.S. PATENT DOCUMENTS

| | | | | |
|---|---|---|---|---|
| 2,377,812 | A * | 6/1945 | Scheiwer | 285/277 |
| 4,471,978 | A | 9/1984 | Kramer et al. | |
| 4,483,510 | A * | 11/1984 | Palau et al. | 251/149.6 |
| 4,863,201 | A | 9/1989 | Carstens | |
| 5,535,985 | A * | 7/1996 | Larbuisson | 251/149.9 |
| 5,806,832 | A * | 9/1998 | Larbuisson | 251/149.6 |
| 5,895,078 | A | 4/1999 | Le Clinche et al. | |
| 2003/0146623 | A1* | 8/2003 | Lacroix | 285/308 |
| 2004/0094956 | A1* | 5/2004 | Lacroix et al. | 285/306 |

FOREIGN PATENT DOCUMENTS

| | | |
|---|---|---|
| FR | 1402040 | 6/1965 |
| FR | 2511115 | 2/1983 |
| WO | 0155632 | 8/2001 |

* cited by examiner

*Primary Examiner*—Aaron M Dunwoody
*Assistant Examiner*—Fannie Kee
(74) *Attorney, Agent, or Firm*—Dowell & Dowell, P.C.

(57) ABSTRACT

This connection comprises two elements, male and female, adapted to fit axially in each other, the body of the female element being equipped with a lock mounted to slide and pierced with at least one opening for the fit of the male element. The wall of this opening is equipped with at least one element in relief adapted to cooperate with a corresponding element in relief of the male element in order to retain these elements in fitted configuration. The lock is in two parts and comprises a first part on which may be exerted, from outside the body, an effort of displacement, as well as a second part mobile with respect to the first part and bearing the aforementioned element in relief. A safety member is adapted to block the first part against the effort of displacement, without preventing the displacement of the element in relief with respect to the first part of the connection. The male and female elements may be uncoupled by exerting an additional effort of fit, then by exerting an effort of penetration of a part of the lock in the body and by withdrawing the male element from the female element.

13 Claims, 5 Drawing Sheets

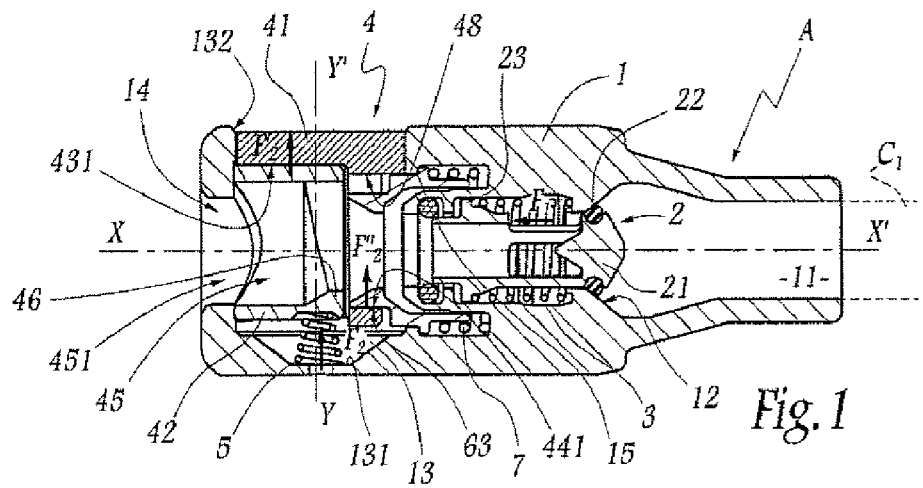

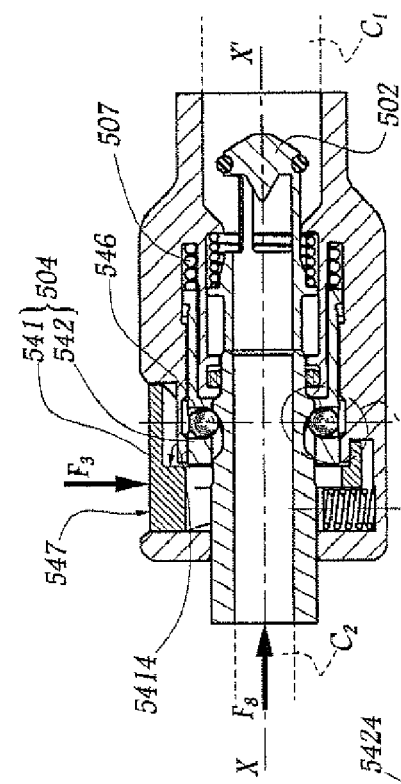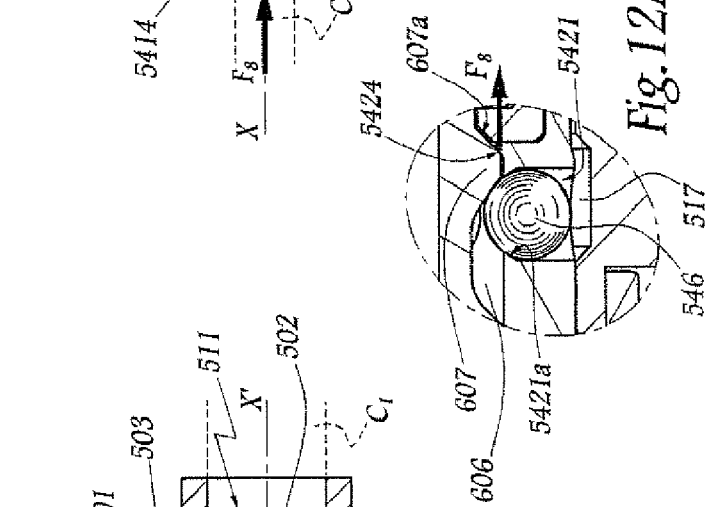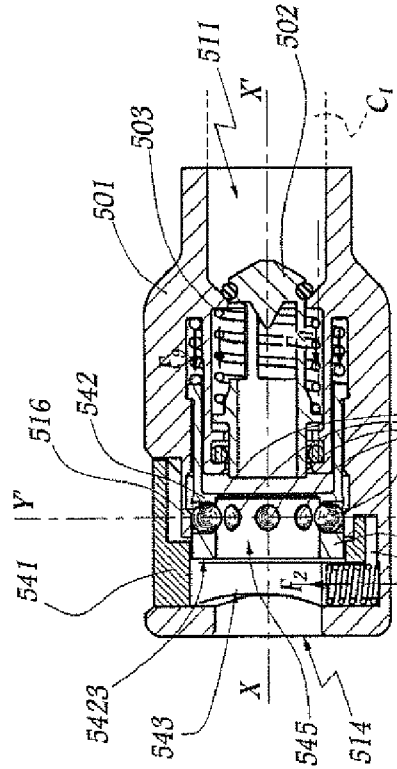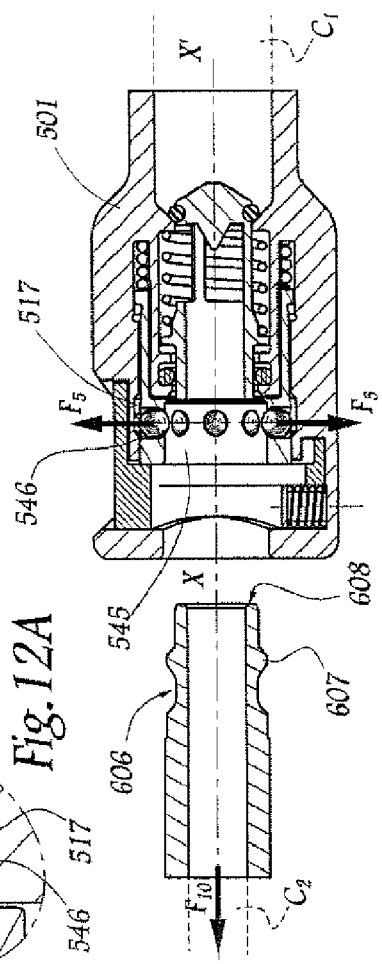

QUICK CONNECTION AND METHOD FOR UNCOUPLING THE MALE AND FEMALE ELEMENTS OF SUCH A CONNECTION

FIELD OF THE INVENTION

The present invention relates to a quick connection for removably joining two pipes through which a fluid flows, as well as to a process for uncoupling the male and female elements of such a connection.

BACKGROUND OF THE INVENTION

French Patent FR 2 514 855 discloses a quick connection which comprises two elements, male and female, adapted to fit axially, provoking the opening of a valve mounted in the body of the female element, this body being equipped with a loaded lock, mounted to slide in this body and pierced with a central opening for the fit of the male element. The wall of the opening of the lock presents teeth offset with respect to one another along a median axis of this opening, while the male element is provided with a shoulder adapted to rest selectively against one or the other of these teeth. When the connection is in passing configuration, a first tooth of the lock maintains the male element in is place in the female element.

This conventional arrangement is satisfactory from the standpoint of robustness and reliability.

However, this connection risks being opened accidentally, particularly under the effect of a shock or a bump against an obstacle. In effect, the quick connection elements are generally mounted at the end of flexible pipes and may be subjected to different stresses or interactions from their environment which might cause an untimely opening of the connection.

In certain applications, such an untimely opening is prohibitive insofar as it may lead to the interruption of the supply of a member consuming a fluid. In particular, such is the case of the connections used in the systems supplying breathable air to an operator wearing a protective suit in a hostile or polluted environment.

It is a more particular object of the invention to overcome these drawbacks by proposing a quick connection which does not risk being uncoupled accidentally and which, on the contrary, requires a conscious maneuver by the operator, such maneuver being, moreover, easy and intuitive.

SUMMARY OF THE INVENTION

In this spirit, the invention relates to a quick connection for removably joining two pipes through which a fluid flows, this connection comprising two elements, male and female, adapted to fit axially in each other, the body of the female element being equipped with a lock mounted to slide in this body and pierced with at least one opening for the fit of the male element, the wall of this opening itself being equipped with at least one element in relief adapted to cooperate with a corresponding element in relief of the male element in order to retain the aforementioned elements in fitted configuration. This connection is characterized in that the lock is in two parts and comprises a first part on which may be exerted, from outside the body of the female element, an effort of displacement, as well as a second part, mobile with respect to the first and bearing the element in relief, while a safety member is adapted to block the first part against the effort of displacement without preventing the displacement of the element in relief with respect to the first part.

Thanks to the invention, the safety member may prevent an untimely abutment on the first part of the lock from resulting in an accidental release of the male element with respect to the female element. Furthermore, the fact that the movements of the element in relief remain possible, even when the first part of the connection is locked by the safety member, renders this lock compatible with the fitting of the male element in the female element.

The invention also relates to a process for uncoupling the male and female elements of a quick connection which may be carried out with a connection as described hereinabove. This process is characterized in that it comprises steps consisting in:

exerting an additional effort of fit of the male and female elements in each other, then exerting on a part of the lock an effort of penetration in the body, and withdrawing the male element from the female element by a movement in the direction of fit of the aforementioned elements.

Such a process is easy to carry out by an operator, while it does not risk being implemented accidentally, under the effect of a shock, a relative rotation of the male and female elements, or even a manual pressure on the lock by distraction.

Finally, the invention relates to a connection adapted to be maneuvered in accordance with the above process and in which the male and female elements are adapted to be uncoupled, after having been fitted in each other, by exerting an additional effort of fit of the male and female elements in each other, then by exerting on a part of the lock accessible from outside the body an effort of penetration of this part in this body and by withdrawing the male element from the female element by a movement parallel to the direction of fit.

BRIEF DESCRIPTION OF THE DRAWINGS

The invention will be more readily understood and other advantages thereof will be more clearly apparent on reading the following description of two forms of embodiment of a connection in accordance with its principle and of its method of use, given solely by way of example and made with reference to the accompanying drawings, in which:

FIG. 1 is a longitudinal section through a female element of a quick connection according to a first form of embodiment of the invention.

FIG. 2 is a section similar to FIG. 1 while the male element of the quick connection is being introduced in the female element.

FIG. 4 is a section along line IV-IV in FIG. 3, but on the scale of FIGS. 1 and 2.

FIG. 9 is a section similar to FIG. 1 for a connection in accordance with a second form of embodiment of the invention.

FIG. 10 is a section similar to FIG. 2 for the connection of FIG. 9.

FIG. 12 is a section similar to FIG. 10 during a first step of the uncoupling of the male and female elements.

FIG. 12A is a view on a larger scale of detail Z in FIG. 12, and

FIG. 13 is a section similar to FIG. 12 during a second step of the uncoupling.

DESCRIPTION OF PREFERRED EMBODIMENTS

Figure 3:
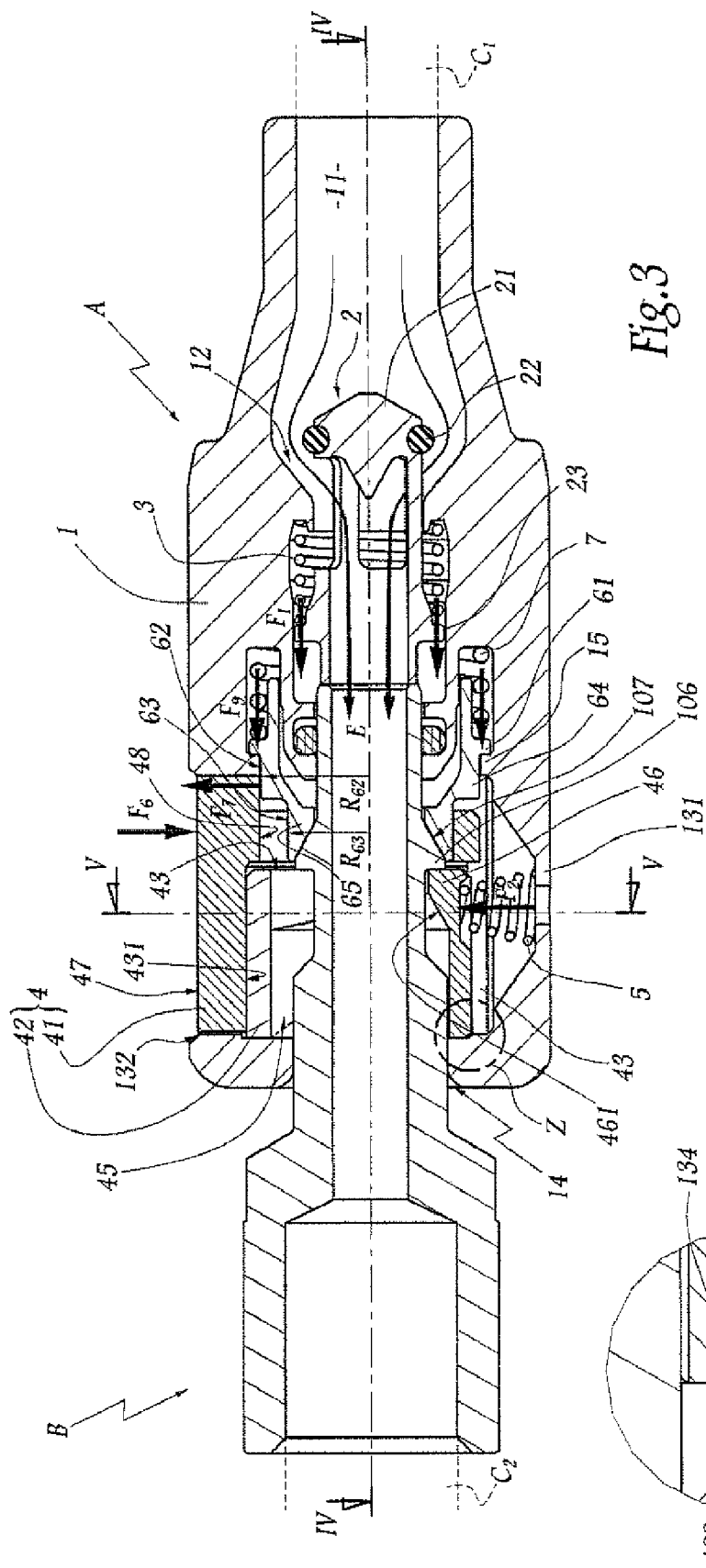
FIG. 3 is a section on a larger scale of the male and female elements in coupled configuration.
Figure 3A:
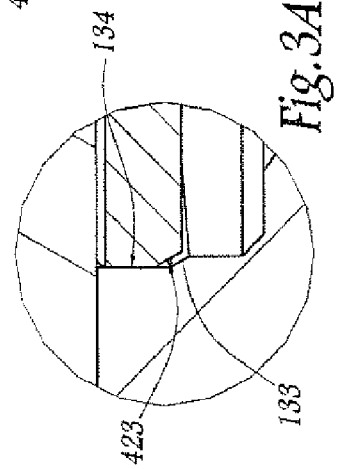
FIG. 3Z is a view on a larger scale of detail Z in FIG. 3.

Referring now to the drawings, the connection shown in FIGS. 1 to 7 comprises a female element A and a male element or connector B respectively connected to an upstream pipe $C_1$ and to a downstream pipe $C_2$. The upstream pipe is, itself, connected to a source of fluid under pressure (not shown), for example a source of air under pressure, pipe $C_2$ itself being connected, for example, to a breathing apparatus of a protective suit.

The external shape of the body 1 of the female element is substantially cylindrical with circular base, centred on an axis X-X' which is also the longitudinal axis of a conduit 11 inside the body 1 and in which is disposed a valve 2 mobile along axis X-X'.

The valve 2 is subjected to the action of a return spring 3 which exerts an effort $F_1$ tending to apply a head 21 of the valve 2 provided with an O-ring 22 against a tight bearing seat 12 formed by the body 1. The valve 2 is provided with an outer radial flange 23 against which the spring 3 comes into abutment.

The body 1 is also provided with a blind housing 13 extending substantially in the direction of an axis Y-Y' perpendicular to axis X-X', i.e. radial with respect to the body 1. Inside the blind housing 13 there is slidably mounted a lock 4 on which a spring 5 exerts an elastic effort $F_2$ directed opposite the bottom 131 of the blind housing 13, i.e. in the direction of its opening 132.

The lock 4 is in two parts, in that it is constituted by a first part, or outer part 41 and by a second part, or inner part 42, this inner part being received in a recessed housing 43 opening out both in the direction of the bottom 131 of the blind housing 13 and in the direction of the opening 14 of the body 1 through which the body 101 of the male connector B may be introduced.

Outer part 41 also defines a substantially circular opening 44 which is adjacent the recessed housing 43.

Inner part 42 is provided with a central opening 45 which is bordered by an element in relief 46 intended to constitute an element in relief or a tooth 46 for stopping a flange 106 provided on the periphery of the body 101 of the male element B.

In the absence of interactions with the element B, the inner part 42 of the lock 4 is applied by the spring 5 against the bottom 431 of the recessed housing 43.

Figure 7:
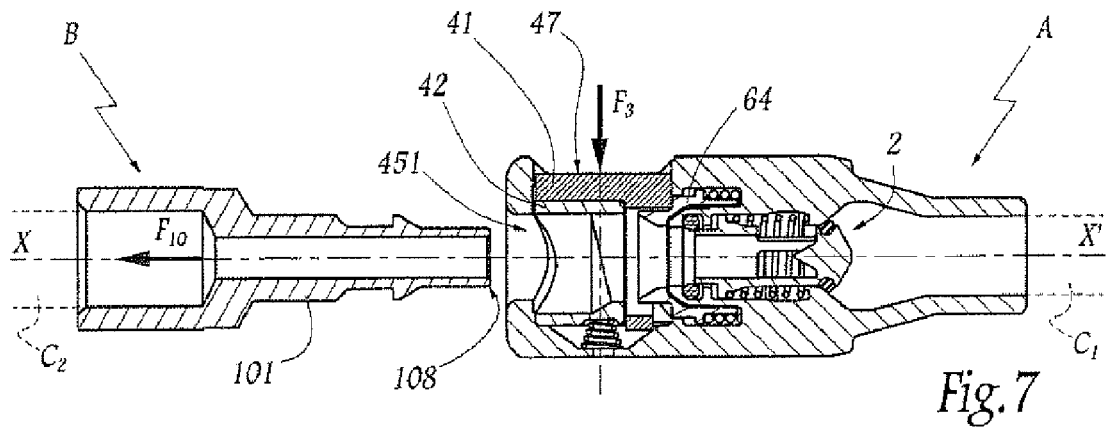
FIG. 7 is a section similar to FIG. 6, during a second step of the uncoupling.

A surface 47 of the outer part 41 is accessible via the opening 132 of the blind housing 13, i.e. the surface on which a user may exert an effort of displacement $F_3$ of the lock 4 in the direction of the bottom 131 of the blind housing 13, as shown in FIG. 7.

A safety member 6 in the form of a piston is provided in the body 1 and is elastically loaded by a spring 7 in the direction of the opening 14. This piston 6 is symmetrical of revolution about axis X-X' and comprises an outer radial flange 61 intended to come into abutment against an inner shoulder 15 of the body 1, in order to limit the movement of the piston 6 in the direction of the opening 14. From the outer radial flange 61 and in the direction of the opening 14, the piston 6 comprises two cylindrical surfaces 62 and 63 with rectilinear generatrices and circular bases, the radius $R_{62}$ of the surface 62 being greater than the radius $R_{63}$ of the surface 63.

An end part 64 of the safety member 6 is surrounded by the surface 62. An intermediate part 65 of the safety member 6 is surrounded by the surface 63.

Part 65 is introduced in the opening 44 of the lock 4, with the result that the part of its surface 63 located between axis X-X' and the bottom 131 of the blind housing 13 constitutes a stop surface opposite the movements of the lock 4 toward the outside of the blind housing 13 under the effect of the effort $F_2$. In effect, the effort $F_2$ exerted by the spring 5 on the inner part 42 is transmitted to the outer part 41 in the form of an effort $F'_2$ transmitted to the level of the bottom 431 of the recessed housing 43, this effort $F'_2$ itself being transmitted in the form of an effort $F''_2$ to the interface between the surface 63 and the circular surface 441 delimiting the opening 44.

Furthermore, the surface 62 receives in abutment a surface 48 of the outer part 41 which is opposite the surface 47, with the result that the end part 64 constitutes a stop to an effort of penetration of the lock 4 against the effort $F_2$.

In this way, in the configuration of FIGS. 1 to 5, the piston 6 prevents an untimely penetration of the outer part 41 of the lock 4 inside the blind housing 13.

On the other hand, and as is apparent from FIGS. 2 to 5, this piston 6 does not oppose a coupling of the male and female elements in the direction X-X'. In effect, when the male element B is fitted in the female element A, the truncated surface 107, defining the flange 106 toward the front end 108 of the body 101, forms a bearing ramp adapted to cooperate with the inclined surface 461 defining the element in relief 46 toward the opening 451 of the central opening 45. When an effort $F_4$ of fit of the male element B in the female element A is exerted, the surfaces 107 and 461 slide over each other, this having the effect of exerting on the inner part 42 of the lock 4 an effort $F_5$ pushing this part against the effort $F_2$, as shown in FIG. 2. This leads to a movement of the inner part 42 in the recessed housing 43 in the direction of the bottom 131, while the outer part 41 of the lock 4 remains immobile with respect to the body 1.

Figure 5:
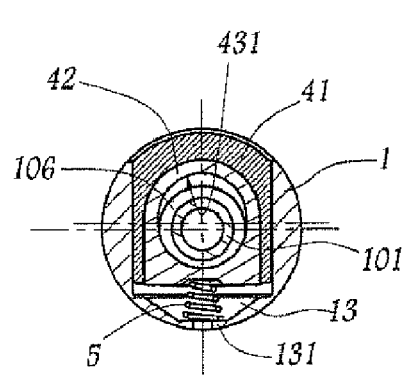
FIG. 5 is a section along line V-V in FIG. 3, but on the scale of FIGS. 1 and 2.
Figure 8:
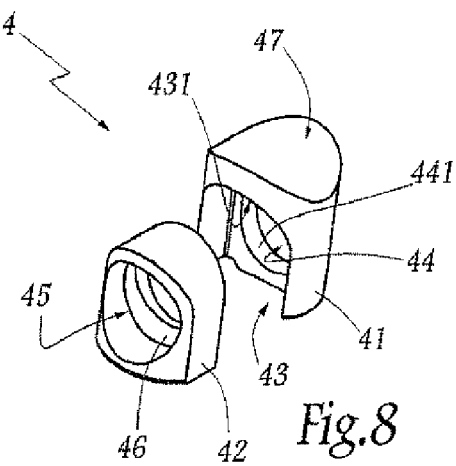
FIG. 8 is a view in perspective of the two parts constituting the lock of the connection of FIGS. 1 to 7.

When the flange 106 has passed beyond the element in relief 46, the spring 5 pushes, by its effort $F_2$, the inner part 42 in the direction of the bottom 431 of the recessed housing 43. The configuration of FIGS. 3 to 5 is then attained, in which the male and female elements are efficiently retained in coupled configuration.

Due to the introduction of the body 101 in the body 1, the front end 108 has pushed the valve 2 against the effort $F_1$ and the connection allows a flow of fluid from pipe $C_1$ towards pipe $C_2$, as represented by arrows E.

From this configuration, if an accidental effort $F_6$ is exerted on the surface 47, this effort is balanced by an effort of reaction $F_7$, due to the end part 64 of the safety member 6, with the result that the male and female elements do not risk being uncoupled. The same applies in the case of relative rotation of the male and female elements about axis X-X.

Figure 6:
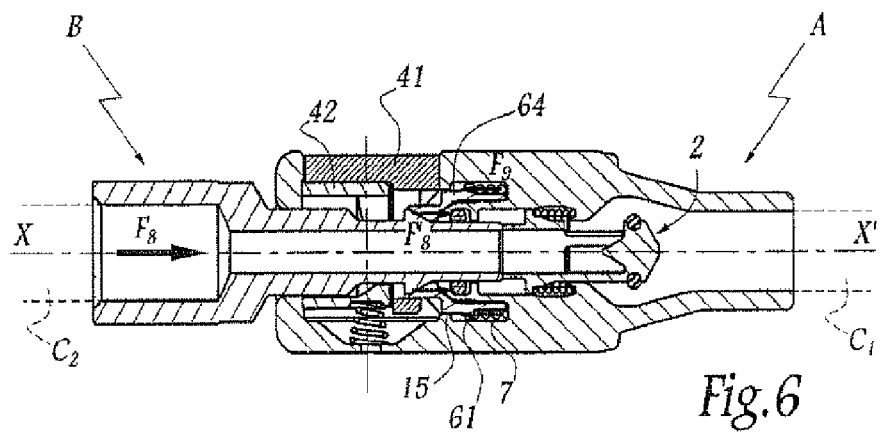
FIG. 6 is a section similar to FIG. 2, during a first step of the uncoupling of the male and female elements.

When the male and female elements are to be uncoupled, it suffices for the user to exert a new effort $F_8$ on the body 101, this effort $F_8$ being directed parallel to axis X-X' and in the direction of the body 1, as shown in FIG. 6. Insofar as, in the configuration of FIGS. 3 to 5, the truncated surface 107 is in abutment against an internal truncated surface 66 of the intermediate part 65, the effort $F_8$ is transmitted to the piston 6 in the form of an effort $F'_8$ which has the effect of pushing the piston 6 against the elastic effort $F_9$ generated by the spring 7.

In other words, the effort $F_8$ transmitted to the piston 6 has the effect of passing this member from the configuration of FIGS. 3 to 5 to that of FIGS. 6 and 7 in which the end part 64 is pushed outside the blind housing 13, to such a point that it is no longer opposite the surface 48 and it no longer opposes the displacement of the outer part 41 under the effect of an effort $F_3$ exerted on the surface 47, as indicated previously.

The member or piston 6 is therefore mobile between the position of FIGS. 1 to 5, where it opposes a penetration of the outer part 41 in the direction of the bottom 131 of the blind housing 13, and the configuration of FIGS. 6 and 7, where it does not oppose such a movement.

Due to the penetration of the outer part 41 in the blind housing 13, the inner part 42 is also displaced in the direction of the bottom 131, which has the effect of disengaging the element in relief 46 with respect to the flange 106 of the body 101, the body 101 in that case being able to be easily withdrawn from the body 1 by an effort $F_{10}$ exerted parallel to the axis X-X' and in a direction opposite the effort $F_8$.

During a first step of uncoupling the female and male elements, A and B, respectively, the intermediate part 65 of the piston 6 remains engaged in the opening 44, with the result that the surface 63 efficiently retains the outer part 41 in the blind housing 13 when the user releases his/her effort $F_3$ and thus, even if the spring 5 pushes the lock 4 toward the opening 132.

The blind housing 13 is provided with a stop 133 which is oblique with respect to the axes X-X' and Y-Y', while the inner part 42 is provided with a bevel 423 likewise oblique with respect to these axes. In the configuration of FIGS. 3 to 5, the efforts $F_1$ and $F_9$ respectively exerted by the springs 3 and 7 have the effect of pushing the body 101 of the male connector B in the direction of the opening 14, with the result that the flange 106 firmly applies the inner part 42 against the part 134 of the surface of the blind housing 13 closest to the opening 14.

If, due to friction efforts which are produced during a relative rotation of the male and female elements, the inner part 42 tends to be pushed against the effort $F_2$, the bevel 423 comes into abutment against the stop 133, thus limiting the displacement of the inner part 42 in the direction of the bottom 131 of the blind housing 13. In this way, the element in relief or tooth 46 does not risk being accidentally "retracted" with respect to the flange 106.

When it is desired effectively to uncouple the male and female elements, the effort $F_3$ exerted on the surface 47 is sufficient to cause the inner part 42 to slide against the surface 134 and against the stop 133, having overcome the efforts $F_1$ and $F_9$. In other words, the oblique nature of the stop 133 then makes it possible to cause this stop to pass to the inner part 42 when the male and female elements are to be unlocked.

A connection according to the invention does not necessarily comprise a housing similar to that shown with recessed housing 43. In effect, outer and inner parts 41 and 42, respectively, may both be guided in the blind housing 13 independently of each other.

The invention has been shown with a lock of which the second part 42 is "internal" with respect to its first part 41 which is "external" and which defines the recessed housing 43. However, it is applicable with other configurations of these parts.

In addition, the invention is not limited to the cases where, as in the example shown, the second part 42 is mobile in the recessed housing 43 in translation parallel to the direction Y-Y' of slide of the lock. It is applicable with a second part mobile with respect to the first, in translation in an oblique direction or pivoting.

In practice, the invention is applicable in all cases where the lock, locked by default, bears a hooking tooth provided on the second part which remains displaceable by the male connector downwardly in FIGS. 1 to 4, while the first part is blocked.

In the second form of embodiment of the invention shown in FIGS. 9 to 13, elements similar to those of the first embodiment bear identical references increased by 500.

The connection of this embodiment comprises a female element A and a male element or connector B each connected to a pipe $C_1$ or $C_2$ as in the first embodiment. The body 501 of the female element is centred on an axis X-X' which is also the longitudinal axis of a conduit 511 inside the body 501 and in which is disposed a valve 502 mobile along this axis. A spring 503 exerts an elastic effort $F_1$ for loading the valve 502 towards its position of closure, in abutment against a seat 512 of the body 501.

The body 501 is also provided with a blind housing 513 which extends substantially along an axis Y-Y', radial with respect to axis X-X' and in which is disposed a first part 541 of a lock 504, this part being subjected to an elastic effort $F_2$ exerted by a spring 505 in abutment on the bottom 631 of the blind housing 513.

The lock 504 also comprises a second part 542 formed by a ring mobile parallel to axis X-X' and provided with a plurality of orifices 5421 passing radially therethrough and in each of which a ball 546 is disposed.

Toward the central opening of the second part or ring 542, the orifices 5421 present a diameter reduced by a peripheral lip 5421a, this diameter being less than that of the balls 546, which makes it possible to retain the balls in the orifices 5421 which act as housing.

In order to allow slide of the part 542, the blind housing 513 extends around the conduit 511 in the form of an annular recess 513a, blind and centred on axis X-X' in which is disposed a spring 507 which exerts on an end heel 5422 of the ring 542 an effort $F_9$ tending to push this ring 542 in the direction of the opening 514 of the female element A.

The body 501 forms a sleeve 516 for guiding in translation which surrounds that portion of the second part 542 which is not engaged in the recess 513a. The sleeve 516 is circular and provided with an inner peripheral groove 517 located at a non-zero distance d from the free edge of the sleeve 516. Under the effect of the effort $F_9$, the second part 542 is positioned so that the orifices 5421 are opposite that portion of the sleeve 516 of width d which is located between the edge 5423 and the groove 517. In this way, taking into account the internal diameter of the sleeve 516 and the external diameter of the second part 542, the balls 546 are blocked, by the sleeve 516 and inside the orifices 5421, in a configuration where they project radially toward axis X-X' in the central opening 545.

The sleeve 516 also forms a stop to the displacement of the first part 541 under the effect of the effort $F_2$ as the first part 541 comes into abutment, by a portion 5411, against the outer radial surface of the sleeve 516 closest to the bottom 631 of the blind housing 513.

The balls 546 are intended to immobilize the male connector B by engaging in an element of relief or a groove 606 made on the outer surface of the body 601 of this element.

The second part 542 is radially engaged inside the first part 541. More precisely, the second part 542 may slide parallel to axis X-X' in the central interior volume 543 of the first part 541 which is open on the sleeve 516 side.

The portion 506 denotes the portion of the ring 542 located between the orifices 5421 and the edge 5423 of the second part 542 closest to the opening 514.

Under the effect of the effort $F_9$, the portion 506 is disposed opposite a portion 5412 of the first part 541 of relatively large thickness $e_1$, while the sleeve 516 is disposed opposite a portion 5413 of the first part 541 of thickness $e_2$ whose value is less than that of the thickness $e_1$.

Figure 11:
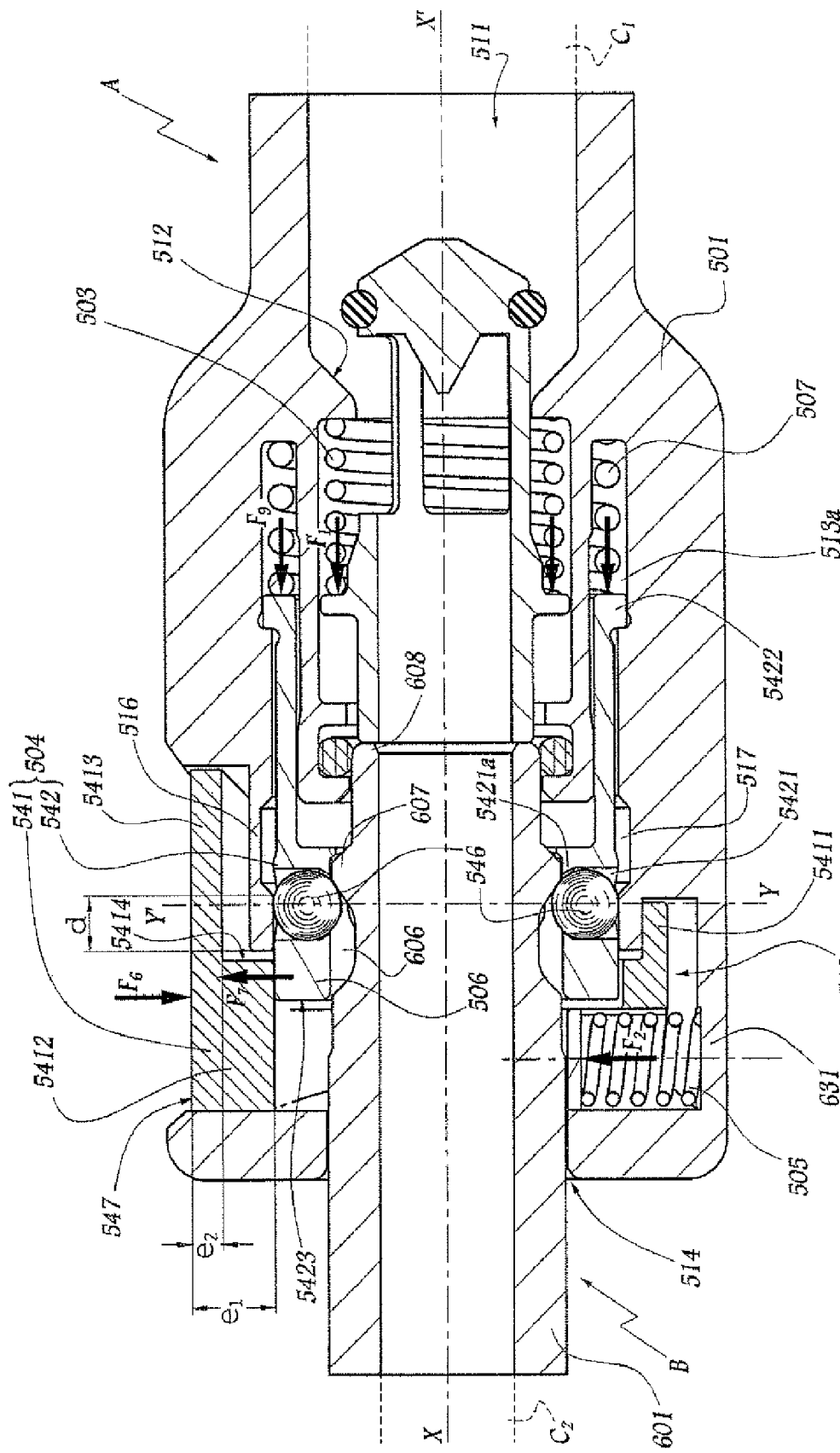
FIG. 11 is a section on a larger scale of the male and female elements of the connection of FIGS. 9 and 10 in fitted configuration.

In the configuration of FIG. 11, if an effort $F_6$ is exerted on the surface 547 of the lock 504 accessible from outside the body 501, an effort of reaction $F_7$ is exerted in return by the portion 506, thus preventing the penetration of the first part 541 in the direction of the bottom 631 of the blind housing 513. The portion 506 therefore constitutes a safety member blocking the penetration of the first part 541 in the blind housing 513.

An element in relief or a flange 607 is an outer radial flange of the body 601 located between the groove 606 and the front end 608 of this body.

When elements A and B are being fitted, the body 601 is displaced in the direction of the rear of the body 501 and of the pipe $C_1$, to such a point that the flange 607 abuts against the balls 546 which project in the opening 545. By continuing the movement of fit in the direction of arrow $F_4$ in FIG. 10, the balls 546 and the second part 542 of the lock 504 are pushed until the balls 546 are located opposite the groove 517, this allowing their partial radial ejection from the orifices 5421, as represented by arrows $F_5$ in FIG. 10, allowing the passage of the flange 607 at the level of the balls 546.

When the flange 607 has gone beyond the balls 546, the effort $F_9$ exerted by the spring 507 pushes the second part 542 of the lock 504 toward the opening 514, this offsetting the orifices 5421 of the groove 517, maintaining the balls 546 engaged in the groove 606, and guaranteeing the coupling in the configuration of FIG. 11.

If, in this configuration shown in FIG. 11, an effort $F_6$ is exerted on the surface 547 of the first part 541 accessible from outside the blind housing 513, the portion 5412 of the first part 541 bears against the portion 506 and the induced reaction effort $F_7$ opposes the penetration of the first part 541 of the lock 504 in the blind housing 513. In this way, any accidental uncoupling may be avoided.

When the male and female elements are to be uncoupled, an additional effort of fit $F_8$ parallel to axis X-X' and directed toward the rear of the body 501 is exerted on the body 601, as shown in FIGS. 12 and 12A. The side 607a of the flange 607 which faces the end 608 then comes into abutment against an internal truncated surface 5424 of the second part 542. The side 607a is also truncated and its geometry is substantially complementary of the surface 5424, which allows a surface abutment of the flange 607 against the part second 542. The effort $F_8$ is thus transmitted, in the form of an effort $F'_8$ distributed about axis X-X', to the second part 542 which is pushed against the effort $F_9$.

Under the effect of effort $F'_8$, the second part 542 is pushed toward the rear of the body 501, in the configuration of FIGS. 11, 12, and 12A, where the orifices 5421 and the balls 546 are substantially opposite the groove 517.

In this configuration, it is possible to exert on the surface 547 an effort $F_3$ directed toward the bottom 631 and which has the effect of displacing the portion 5412 of the first part 541 to a configuration where an inner shoulder 5414, formed on the first part 541 at the transition between the parts 5412 and 5413, forms a stop to the movement of the second part 542 in the direction of the opening 514 under the effect of the effort $F_9$. The edge 5423 then comes into abutment against the shoulder 5414.

In other words, once the balls 546 have been brought opposite the groove 517, it is possible, by displacing the first part 541 of the lock 504 toward the bottom of the blind housing 513, to maintain the second part or ring 542 in the corresponding position, thus allowing the balls 546 to be displaced radially toward the outside of the orifices 5421, being driven from the opening 545. It is then possible to exert on the body 601 an effort $F_{10}$, of direction opposite the effort $F_8$, this effort inducing the withdrawal of the male connector by partial radial ejection of the balls 546 in the groove 517, as represented by arrows $F_5$.

In this way, the connection of this second form of embodiment may be manipulated in intuitive and secure manner, like that of the first embodiment.

This connection presents the particular advantage that the effort of retaining the male and female elements in coupled configuration is distributed about the male connector B due to the eight balls 546 being regularly distributed about axis X-X'. The invention may function with a variable number of balls, the number of balls being easily determined by the person skilled in the art.

The dimensions of the parts constituting the connections shown are adapted to the desired functions, in particular of guiding and blocking, which the person skilled in the art can readily imagine. For example, the external diameters of the elements 607 and 542 are thus slightly less than the internal diameters of the elements 545 and 516.

In order to render the drawings clearer, the invention has been shown with a body 1 or 501 of a female element in one piece. It is obvious that this body may be formed of a plurality of parts, particularly in order to allow elements 2, 3, 41, 42, 5, 6 and 7 of the first embodiment and the corresponding elements of the second embodiment, to be placed in position.

What is claimed is:

1. A quick connection for removably joining two pipes through which a fluid flows, the connection comprising: a male element and a female element adapted to fit axially relative to one another, the female element including a body in which a lock is slidably mounted, the lock having at least one opening for the fit of the male element, a wall defining the at least one opening having at least one first element in relief adapted to cooperate with a corresponding second element in relief of the male element in order to retain the male and female elements in fitted configuration, the lock including a first part on which may be exerted, from outside the body, a force of displacement, and a second part, movable with respect to the first part and bearing the first element in relief, and a safety member mounted within the female member and being adapted to block the first part against a force of displacement normal to a longitudinal axis of the body of the female element, without preventing displacement of the first element in relief with respect to the first part in a direction normal to the longitudinal axis of the body of the female element.

2. The connection of claim 1, further comprising means for elastically urging the safety member towards a position in which the safety member blocks the first part.

3. The connection of claim 1, wherein the lock is installed in a first housing in which the lock may slide in a direction substantially perpendicular to the direction of fit of the male and female elements between outer and inner positions, and elastic means for urging the lock into the outer position and against a force of displacement.

4. The connection of claim 3, including a stop movable within the first housing so as to be adapted to abut a portion of the second part of the lock.

5. The connection of claim 1, wherein the lock is mounted in a first housing in which its first part may slide against a force of an elastic means for urging the lock against a force of displacement, in a direction substantially perpendicular to the direction of fit of the male and female elements, and the second part is slidable in said first housing in a direction substantially parallel to the direction of fit.

6. The connection of claim 1, wherein the first part defines a housing in which the second part is disposed, the housing being open opposite an actuation surface of the first part.

7. The connection of claim 1, wherein said safety member is movable in a direction parallel to the direction of fit of the male and female elements between a first position where the safety member blocks the first part and a second position where the safety member does not oppose the movement of the first part under the effect of an effort of displacement.

8. The connection of claim 7, wherein said safety member is adapted to be displaced from the first towards the second position by a force applied to urge the male element further within the female element.

9. The connection of claim 8, wherein said safety member is adapted to move from the first to the second position by a force applied to urge the male element further within the female element from a configuration where the male and female elements are initially coupled.

10. The connection of claim 7, wherein the safety member is provided with a surface adapted to receive in abutment the second element in relief of the male element for the transmission of an effort of displacement of said safety member from the first towards the second position.

11. The connection of claim 7, wherein said safety member is provided with a surface forming a stop to the displacement of the lock by a force of an elastic means.

12. The connection of claim 1, wherein said first element in relief of the second part is in one piece with the second part.

13. A process of uncoupling male and female elements of a quick connection previously fitted in each other and retained in coupled configuration by the cooperation of elements in relief formed respectively on the male element and on a wall defining an opening in a lock mounted to slide in a body of the female element and in which the male element is introduced, the process including the steps of:
   exerting a force urging the male and female elements toward each other axially along a longitudinal axis of the body of the female element while coupled by pushing, against an axial elastic effort, a member which blocks a part of the lock that is accessible from outside the body;
   exerting on a part of the lock accessible from outside the body, a force normal to the longitudinal axis of the body; and
   withdrawing the male element from the female element by a movement in the direction of fit of the elements.

* * * * *